(12) United States Patent
Draper et al.

(10) Patent No.: US 6,492,048 B1
(45) Date of Patent: Dec. 10, 2002

(54) SEGREGATED EXHAUST FUEL CELL GENERATOR

(75) Inventors: Robert Draper, Pittsburgh, PA (US); Stephen E. Veyo, Murrysville, PA (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 149 days.

(21) Appl. No.: 09/636,249

(22) Filed: Aug. 10, 2000

(51) Int. Cl.$^7$ ................................................. H01M 8/10
(52) U.S. Cl. ............................. 429/30; 429/25; 429/38
(58) Field of Search ............................. 429/25, 30, 38

(56) References Cited

U.S. PATENT DOCUMENTS

| | | |
|---|---|---|
| 4,395,468 A | 7/1983 | Isenberg |
| 4,664,986 A | 5/1987 | Draper et al. |
| 4,751,151 A | 6/1988 | Healy et al. |
| 4,801,369 A | 1/1989 | Draper et al. |
| 5,047,299 A * | 9/1991 | Shockling .................... 429/20 |
| 5,064,733 A | 11/1991 | Krist et al. |
| 5,134,043 A | 7/1992 | Nakazawa |
| 5,573,867 A | 11/1996 | Zafred et al. |
| 5,712,055 A | 1/1998 | Khandkar et al. |
| 5,733,675 A | 3/1998 | Dederer et al. |
| 5,866,090 A | 2/1999 | Nakagawa et al. |
| 5,928,806 A | 7/1999 | Olah et al. |

* cited by examiner

Primary Examiner—Carol Chaney
Assistant Examiner—Dah-Wei Yuan

(57) ABSTRACT

A fuel cell generator contains a plurality of fuel cells (11) in a generator chamber (20), where oxidant (13) and fuel (1) are fed to the generator chamber (20), where both fuel and oxidant react to form depleted fuel and depleted oxidant, which are separated by steam (2) at a pressure higher than that of both the depleted oxidant stream and the depleted fuel stream, and where all oxidant and fuel passages do not communicate with each other, so that fuel and oxidant (in whatever form) do not mix, and where depleted fuel (26), consisting essentially of carbon dioxide and water, exits for further treatment, so that the remaining carbon dioxide can be separated from the remaining water and is not vented to the atmosphere.

14 Claims, 4 Drawing Sheets

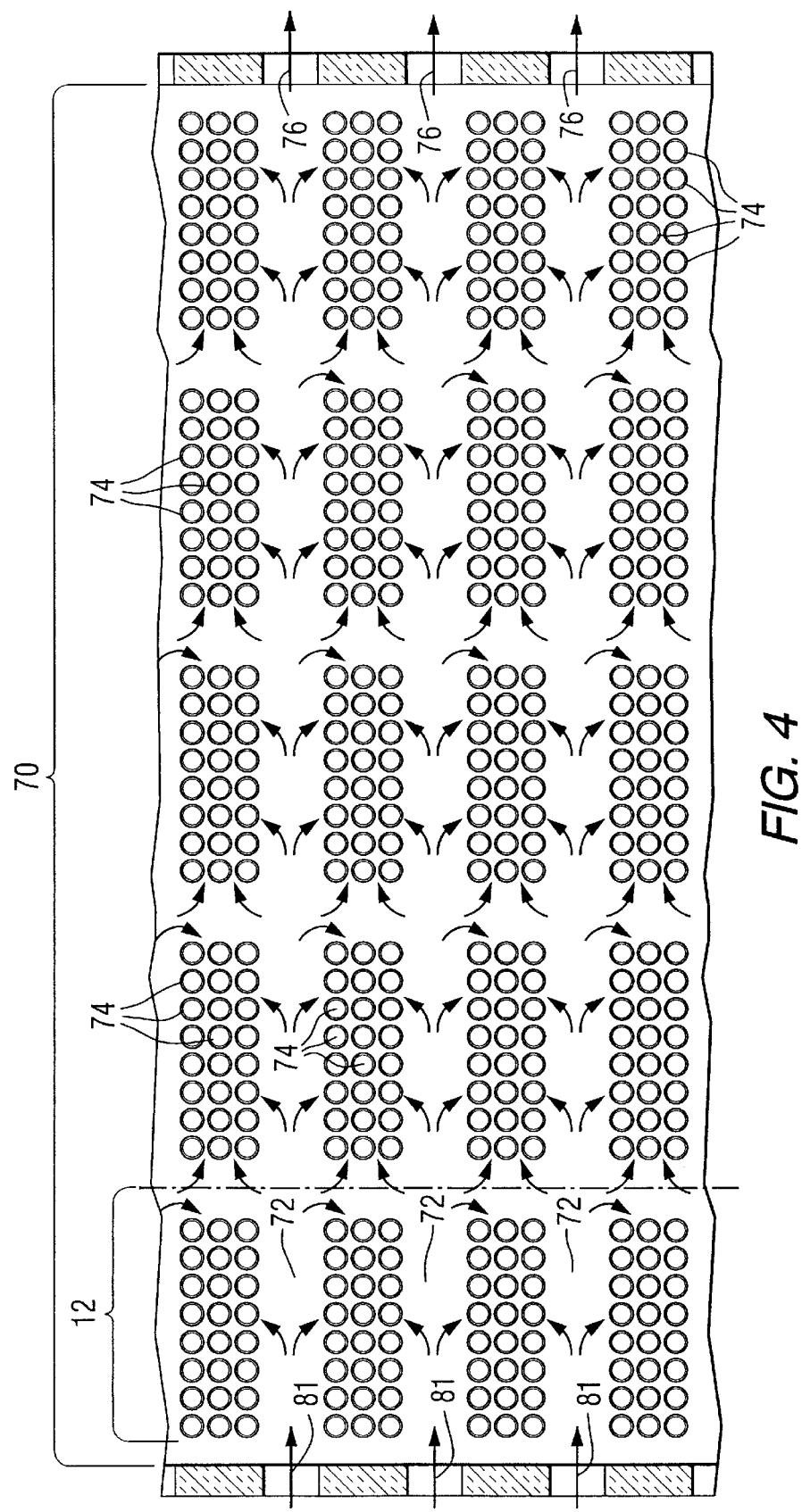

SEGREGATED EXHAUST FUEL CELL GENERATOR

BACKGROUND OF THE INVENTION

1. Field of the Invention

The present invention relates to high temperature fuel cell generators, wherein depleted fuel and depleted air are kept separate from each other to allow treatment of depleted fuel to generate and capture essentially pure carbon dioxide, thereby precluding the release of greenhouse gas to the environment.

2. Background Information

Tubular solid oxide electrolyte fuel cell (SOFC) generators have been well known in the art for almost twenty years, and taught, for example, by A. O. Isenberg in U.S. Pat. No. 4,395,468. There, in the main embodiment, oxygen (as present in air), as oxidant, was reacted at the inside "air" electrode of a closed tubular SOFC, to yield depleted air; and fuel, such as CO and $H_2$, was reacted at an outside "fuel" electrode of the closed tubular SOFC to yield depleted fuel, all in a "generating chamber," at high temperatures (that is, about 1000° C.). The air electrode generally comprised a doped lanthanum manganite, the fuel electrode generally comprised a nickel cermet and an electrolyte disposed between the electrodes generally comprised a stabilized zirconia. The depleted air and depleted fuel were subsequently completely combusted in a separate, but attached preheating chamber, to preheat feed air. This basic SOFC generator design was carried forward, with other improvements, as shown for example in U.S. Pat. Nos. 4,664,986; 5,573,867; and 5,733,675 (Draper et al.; Zafred et al.; and Dederer et al.).

Other designs have used a series of fuel cell stacks, each providing a stage containing a different electrolyte operating at a lower temperature to improve fuel gas utilization, as taught in U.S. Pat. No. 5,712,055 (Khandkar). In a somewhat similar fashion, in one embodiment of U.S. Pat. No. 5,134,043 (Nakagawa), "depleted fuel" from a molten carbonate fuel cell system is sent to a separate molten carbonate anode, where the product was then mixed/contacted with oxidant/air before being introduced into the cathode section of the first molten carbonate electrolyte fuel cell. While tubular fuel cells are emphasized herein, flat or planar fuel cells, which are well known in the art, may also be used.

However, such designs could release byproducts of combustion, such as carbon dioxide into the atmosphere. Efforts are now being made on an international level to globally reduce the release of so-called "green house gases" which includes carbon dioxide, which may contribute to global atmospheric warming. Such efforts may, indeed, lead to future legislation regarding carbon dioxide emissions from SOFCs. What is needed is a means to further treat the spent fuel from fuel cell generators to not only reduce or eliminate carbon dioxide emissions, but also to increase the capacity of the fuel cell generators to further utilize feed fuel, thereby producing more electricity. Such a need applies to both tubular and flat plate type fuel cells.

In the area of reducing carbon dioxide emissions from power plants utilizing a variety of types of fuel cells, in order to reduce the "green house effect", U.S. Pat. No. 4,751,151 (Healy et al.) taught a carbon dioxide absorber, such as monoethanolamine, including a regenerable absorbent, for stripping carbon dioxide followed by subsequent cooling and compression. In U.S. Pat. No. 5,064,733 (Krist et al.), recognizing prior art conversion of natural gas into carbon dioxide and water-with the accompanying creation of a DC electrical current-in a solid oxide fuel cell, taught conversion of the carbon dioxide and water to $C_2H_4$, $C_2H_6$ and $C_2H_2$ by use of a copper, copper alloy or perovskite cathode. That cathode was in contact with the $CO_2$, and $H_2O$ and a dual layered anode made of metallic oxide perovskite next to the electrode with an outer contacting layer of rare earth metallic oxide contacting $CH_4$. This provided for concurrent gas phase electrocatalytic oxidative dimerization of methane at an anode on one side of a solid electrolyte and reduction of carbon dioxide to gaseous hydrocarbons at a cathode on the other side of the solid electrolyte.

Other $CO_2$ treatments include U.S. Pat. No. 5,928,806 (Olah et al.), where a regenerative fuel cell system containing two electrochemical cells in fluid communication were taught, one cell oxidizing an oxygenated hydrocarbon, such as methyl alcohol, formic acid, etc., to $CO_2$ and $H_2O$ and a second cell reducing $CO_2$ and $H_2O$ to an oxygenated hydrocarbon. This produced methyl alcohol and related oxygenates directly from $CO_2$. Also, U.S. Pat. No. 5,866,090, (Nakagaua et al.) taught treating carbon dioxide effluent, from an energy plant which uses fuel cells, with lithium zirconia at over 450° C., to produce lithium carbonate and zirconia.

In the area of separation of gas streams in an apparatus, U.S. Pat. No. 4,801,369 (Draper et al.) taught a solid oxide water electrolyzer using solid oxide fuel cells having oxidant and fuel feeds, where water (in the form of steam) was dissociated to $H_2$ and $O_2$. There, in order to prevent recombination of the $H_2$ and $O_2$ and to eliminate the possibility of fire or explosion, a controlled leakage of additional steam into the $H_2$ and $O_2$ streams, at a high pressure, was used as a separation "seal". This separation means allowed a sealless design, which was important at the 800° C.–1100° C. electrolyzer operating temperatures. In the invention of Draper et al., a separate steam plenum was used to separate the oxygen and hydrogen collecting means. with this design, however, it was difficult to achieve uniformity of steam leakage, so that there was the possibility of diffusion of $O_2$ and $N_2$ into the steam plenum and subsequent mixing of these gases with the fuel.

While a great many methods to treat carbon dioxide are known, a new fuel cell generator design is needed to allow segregation of the carbon dioxide for such treatment.

SUMMARY OF THE INVENTION

Therefore it is a main object of this invention to yield an improved fuel cell generator design, allowing segregation of carbon dioxide generated at the fuel electrodes.

It is a further object of this invention to segregate the depleted oxidant stream from the depleted fuel stream, so that the carbon dioxide can be segregated.

These and other objects are accomplished by providing a high temperature fuel cell generator comprising a generator chamber containing solid oxide electrolyte fuel cells which operate on oxidant and fuel to yield a depleted oxidant stream and a depleted fuel stream consisting essentially of unreacted fuel, $CO_2$ and $H_2O$, where the oxidant and fuel streams do not communicate directly with each other, so that depleted oxidant and depleted fuel remain effectively separated, and where the depleted oxidant stream is separated from the depleted fuel stream by a flow of steam. The depleted fuel exits as a gas consisting essentially of carbon dioxide and water for further treatment, where at least one exit is provided for depleted oxidant to exhaust to the environment. In no instance will the depleted fuel stream contain only $H_2$. The depleted fuel steam will always contain substantial amounts (greater than about 80 vol. %) of $CO_2$ and $H_2O$. The steam separation is preferably effected by means of a separate barrier steam plenum, where the steam is at a pressure higher by approximately 1 psi ($6.89 \times 10^3$ Pa or 6.89 kPa) than either the depleted oxidant stream or the depleted fuel stream, and there may be a controlled leakage of steam into those streams in a seal-less generator design. This higher pressure is achieved by placing a constricting means as a pressure control means in the exit of the barrier steam plenum. Such a constricting means could be selected from an orifice, venturi or the like.

The invention also covers a method of operating a high temperature fuel cell generator containing solid oxide fuel cells with a solid electrolyte disposed between an air electrode and a fuel electrode which operate on oxidant and fuel gases, comprising the steps: (1) feeding feed fuel gas to contact fuel electrodes of fuel cells to yield a depleted. fuel gas stream consisting essentially of unreacted. fuel, $CO_2$ and $H_2O$, and (2) feeding oxidant gas to contact air electrodes of fuel cells to yield a depleted oxidant gas stream; where depleted oxidant gases are kept separated from all depleted fuel gases by a flow of steam. In the operation of this generator, the depleted fuel may be further reacted to yield a gas consisting essentially of carbon dioxide and water.

Thus, this invention relates to an arrangement of components within an fuel cell generator by means of which the exhaust products, such as $CO_2$ and $H_2O$, are segregated from exhausted vitiated air. By this means, water can be condensed from the product exhaust stream, and the carbon dioxide can be pressurized or liquefied and put to use, rather than being released to the atmosphere. Consequently the release of a "green house gas" pollutant is avoided. The main idea is to produce electric power and sequester carbon dioxide. The enclosure surrounding the generator also contains a means to yield steam to a barrier plenum separating a depleted fuel plenum from a depleted oxidant plenum, as well as stack fuel reformer passages positioned between the fuel cells in the generating chamber.

A main part of the invention is a fuel cell generator where a barrier plenum is interposed between a spent fuel plenum and vitiated air plena, where the barrier plenum is supplied with steam from an external source for the purpose of preventing the migration of depleted fuel into vitiated air (or vitiated air into depleted fuel), thus insuring that combustion does not occur.

BRIEF DESCRIPTION OF THE DRAWINGS

For a better understanding of the invention, reference may be made to the exemplary embodiments shown in the accompanying drawings, in which:

FIG. 4 is an overhead view of a preferred steam barrier plenum design.

DESCRIPTION OF THE PREFERRED EMBODIMENTS

Figure 1:
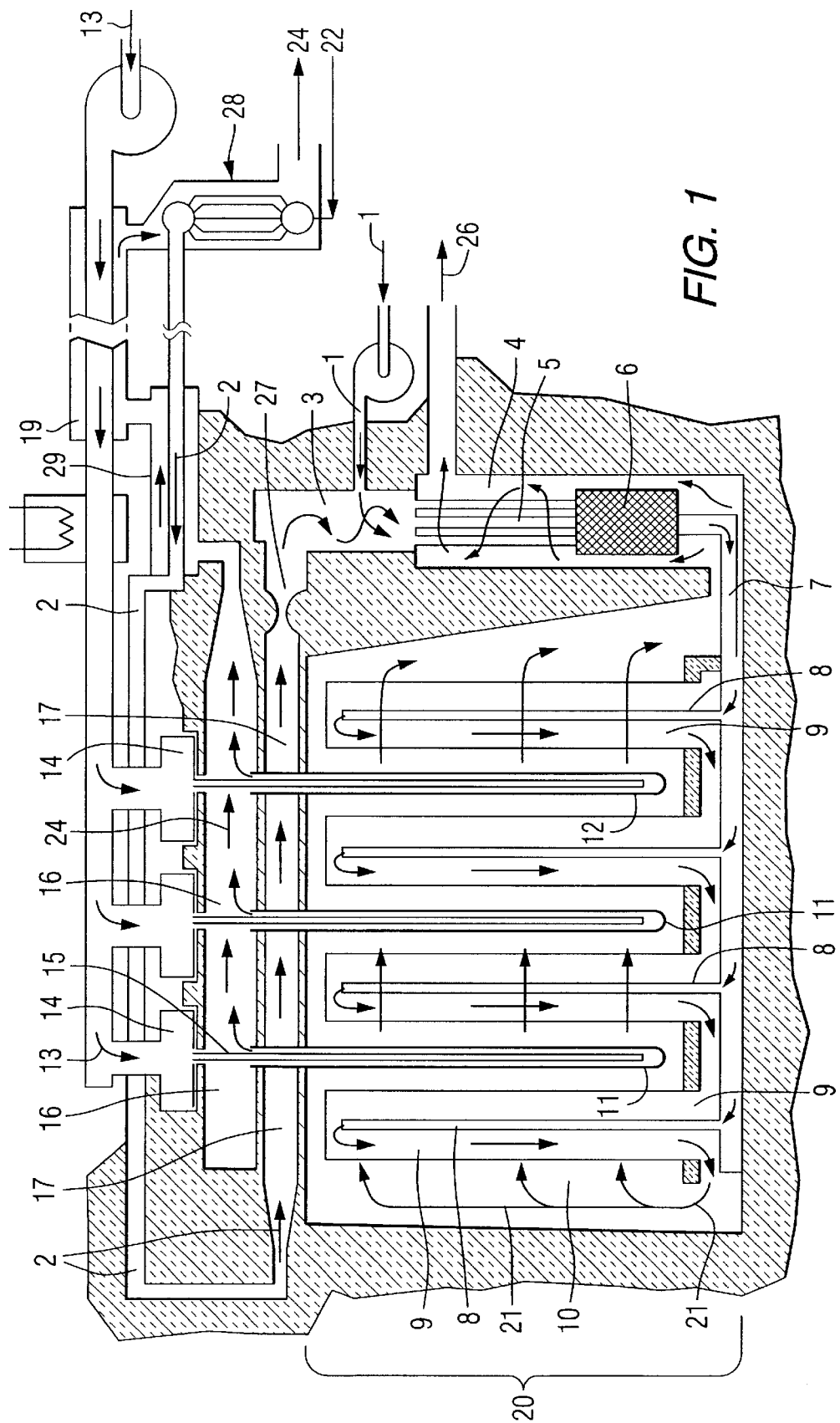
FIG. 1, which best illustrates the invention, is a sectional view of a segregated exhaust SOFC generator showing gas flow paths featuring a once-through flow of fuel.

Referring now to FIG. 1, one embodiment of a fuel cell electrical power generator is shown, wherein the product of combustion ($CO_2$ and $H_2O$) are kept separate from the vitiated exhaust air. A natural gas fuel stream 1 is mixed with a stream of steam 2 within a mixing chamber 3. The combined stream is preheated regeneratively by means of the combustion product stream 4 within a heat changer 5. The preheated fuel/steam mixture passes through a pre-reformer 6 before entering a plenum 7. From this plenum, the mixture passes through riser tubes 8, before descending within reformer plena 9, which are located within the generator. Reformed fuel 21 then passes to a generator entry chamber 10 before passing in cross-flow over solid oxide fuel cells (SOFCs) 11 and a last set of SOFCs used as a high utilization section 12. Products of combustion will yield a substantial amount (herein defined as approximately 80 vol. %, or 80% utilization) of $CO_2$ and $H_2O$; they will also yield heat to the incoming fuel/steam mixture, as previously described. Preferably, there will be at least 85% utilization entering the high utilization section 12 and 99% utilization exiting the section, so that the exhausting stream is composed almost entirely of $CO_2$ and $H_2O$. The $H_2O$ can be condensed to yield a pure water stream and the $CO_2$ can be collected and put to use, and not released into the atmosphere. As used here, the terms "depleted", "vitiated" and "exhausted" are interchangeable.

Also shown in FIG. 1, air 13 enters air feed headers 14, before descending through hollow ceramic oxidant feed tubes 15 (further described in FIG. 3), and then rising through the SOFCs 11 and through the high utilization section 12. Air then travels through the vitiated air plenum 16 and yields heat to the incoming air 13 by virtue of recuperative heat exchanger 19. The exhausting air also yields heat to incoming water 22 within a boiler 28, wherein saturated steam is produced, and yields heat to superheat the steam flow 2 in superheater 29. The stream of steam 2 passes through a barrier plenum 17, which separates the generator section 20 through which the fuel flows from the vitiated air in plenum 16. Steam then passes through an orifice or venturi 27, used as a pressure control or constricting means for controlling steam pressure, and enters the fuel/steam mixing chamber, as previously described.

Some leakage of steam from barrier plenum 17 into both vitiated air plenum 16 and generator plenum 20 is permissible. Leakage of the air into the steam will be prevented to the greatest possible degree by maintaining steam pressure in barrier plenum 17 at a level only slightly higher than the pressure within the air plenum 16 and by use of a close fit where the cell passes through the insulating board which separates the steam and air plena. No seal of a traditional configuration is used. Exhaust air is shown as 24, and substantially depleted fuel ($CO_2$ and $H_2O$) is shown as 26. Additionally, the $H_2O$ in the depleted fuel can easily be condensed, leaving $CO_2$ for further processing.

Figure 2:
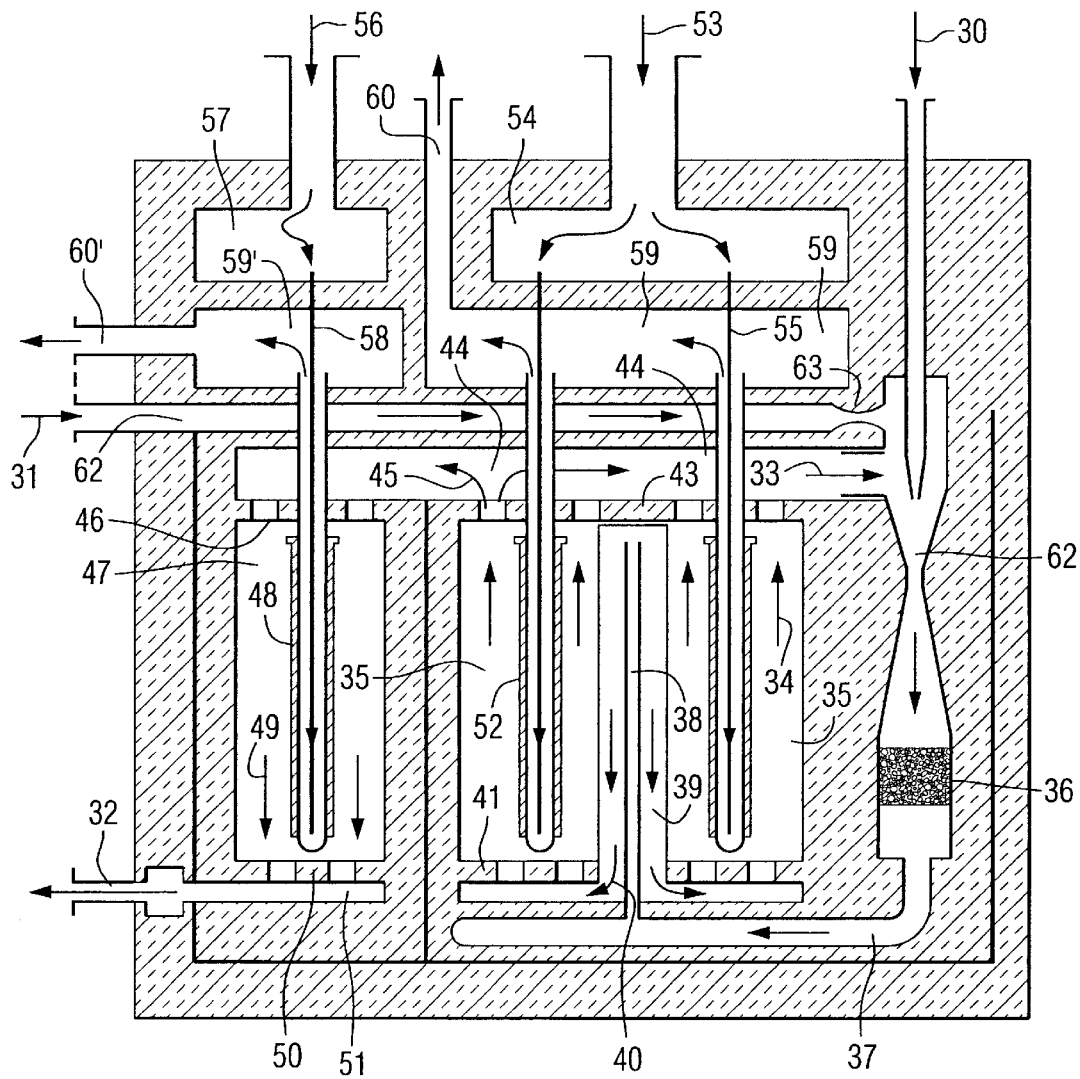
FIG. 2 is a sectional view of an alternative embodiment, wherein the fuel flow in the main generator section is recirculated.

Referring now to FIG. 2, a second embodiment of a fuel cell generator is shown, wherein the products of combustion, $CO_2$ and $H_2O$, are again kept separate from the vitiated exhaust air. A natural gas stream 30 acts as the motive gas for an ejector pump 62 and thus inducts and is mixed with a stream of steam 31 and a recirculated fraction 33 of partially depleted fuel stream 34 which has passed through the main SOFC generator section 35. This gaseous mixture passes through a prereformer 36, distribution tubes 37 and riser tubes 38 before entering chambers 39, which, by virtue of being impregnated with a catalyst, act as reformer passages. The fully reformed fuel gas 40 passes though perforated ceramic boards 41 before entering the generator 35, where it contacts the fuel electrodes of SOFCs. At the top of the generator 35, the partially depleted fuel 34 passes through perforated ceramic boards 43 into a partially depleted fuel plenum 44. Within the plenum, the partially depleted fuel is partitioned, with the larger fraction 33 being recirculated and the smaller fraction 45 passing though perforated ceramic boards 46 and into the high fuel utilization section 47 of the generator, where it flows in a once-through fashion and contacts the fuel electrodes of SOFCs 48. At the end of the high fuel utilization section 47, the almost fully depleted fuel 49 passes though perforated ceramic boards 50 and into a products collection plenum 51 and is exhausted through a port 32.

Also shown in FIG. 2, air 53 enters a chamber 54, which feeds SOFCs 52 of the main generator section 35 via air feed tubes 55, while air 56 enters a chamber 57 and feeds SOFCs 48 of the high fuel utilization section 47 via air feed tubes 58. After passing through the SOFCs and contacting the air electrodes of those cells, vitiated air is released to vitiated air exhaust plena 59 and 59' and leaves through ports 60 and 60', as shown. Steam 31 enters a barrier plenum 62, which is positioned between the partially depleted fuel plenum 44 and the vitiated air exhaust plenum 59. Very importantly, an orifice or venturi 63, which is placed at the end of the barrier plenum, adjacent to the mixing/inductant chamber of the ejector pump 62, acts as a steam pressure/control or constricting means and controls the steam pressure within the barrier plenum. The sizing of this device, along with the clearances in the ceramic boards through which the cells pass, controls the leakage of steam to the vitiated oxidant or air exhaust steam plenum and the partially utilized depleted fuel stream plenum.

Figure 3:
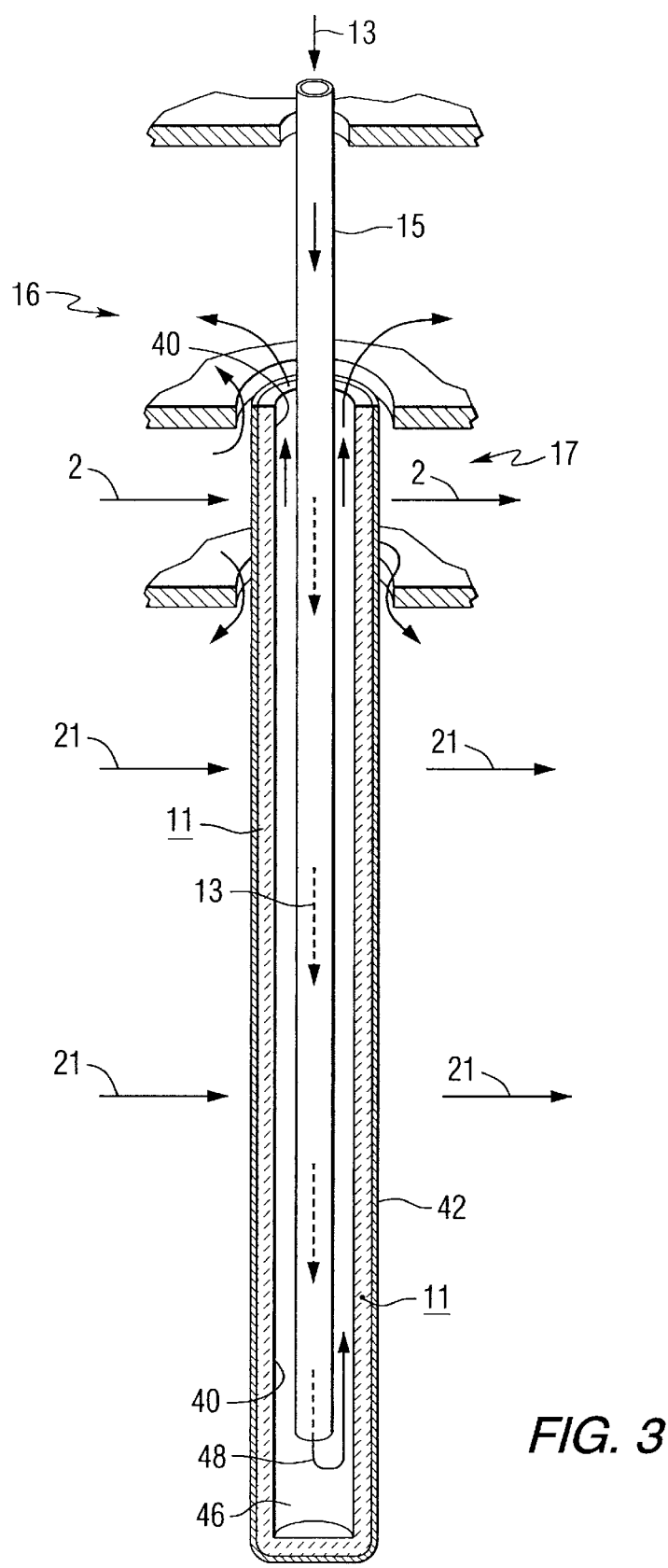
FIG. 3 is a detailed cross sectioned view of a fuel cell with associated oxidant feed inlet tube and depleted fuel gas exit plenum.

FIG. 3 shows a more detailed view of SOFC 11. The SOFC is shown as a tube having an air electrode 40 side, and a fuel electrode 42 side, with solid oxide electrolyte (not shown) disposed between the electrodes. The reformed fuel 21 from generator entry chamber 10 (shown in FIG. 1) passes around the fuel electrode 42 becoming more depleted or spent as it contacts additional fuel cells. The reformed fuel 21 is completely separated from oxidant air 13, which enters hollow oxidant feed tube 15 from air feed headers 14, passing down through the fuel cell until it reaches the bottom 46 of the tube, where the air reverses direction, as shown at 48, and reacts as it flows upward inside the tube at the air electrode 40, exiting in a vitiated state into vitiated air plenum 16. Ionic oxygen traverses the electrolyte and oxidizes fuel electrochemically at the anode. Steam 2 is shown flowing in barrier plenum 17 with controlled leakage into fuel stream 21 and plenum 16.

The steam barrier plenum segregation method offers a major advantage over other methods, in that high temperature ceramic seals are avoided. Another advantage of this method is that, since barrier media (steam) are required in any event for fuel reformation, minimal additional engineering is required.

The orifice or venturi 63 of FIG. 2 (also the orifice or venturi 27 of FIG. 1) at the exit of the steam plenum is not present in the electrolyzer version of U.S. Pat. No. 4,801,369, described previously. By virtue of the orifice of this new design, it is easier to design the steam barrier plenum in such a way as to minimize steam leakage to both recirculated fuel and to vitiated air plena, while providing enough steam to the fuel to support full reformation. Indeed, any excess of steam can be provided.

Depending upon the final design of the generator, the steam barrier plenum might span as many as six cell bundles. Therefore, it is difficult to achieve uniformity of steam leakage to the recirculated fuel and vitiated air plena over the entire length. Uniformity of leakage is important for several reasons. Failure to provide a sufficiently large pressure differential between the steam barrier plenum and the vitiated air plenum might result in diffusion of $O_2$ and/or $N_2$ into the steam plenum and the subsequent mixing of these gases with the fuel. The oxygen might be involved in combustion without damage to the fuel electrode, but this form of direct combustion is to be avoided. The nitrogen would make the condensation of water vapor and the recovery of carbon dioxide more difficult. Failure to provide a sufficiently large pressure differential between the steam barrier plenum and the recirculated fuel plenum would cause fuel and combustion products to leak into the steam plenum. To some degree, fuel and combustion products would then leak into the vitiated air plenum. Loss of fuel in this way is detrimental to performance and, of course, leakage of $CO_2$ to the exhaust air undermines the concept behind this invention. To avoid both of the situations discussed above, the steam barrier plenum will preferably have the configuration shown in FIG. 4.

Referring now to FIG. 4, fuel 81 enters the section of the steam plenum 70 (which lies above the low fuel utilization section of the SOFC generator configuration shown by FIG. 1 or which lies above the high fuel utilization section of the SOFC generator configuration shown by FIG. 2) and is directed to flow in the open lanes 72 before entering SOFC bundles 74 of a plurality of fuel cells from essentially all directions. This obviates the need for the flow to negotiate more than one tube row before entering a leakage passage to either the vitiated air plenum 59 in FIG. 2 or the partially depleted fuel plenum 44 in FIG. 2. By this means, substantial variations in steam pressure within the steam barrier plenum 70 are avoided and more specially uniform leakage is achieved. A fraction 76 of the steam leaves the barrier plenum and enters a chamber where it mixes with recirculated partially utilized fuel and fresh fuel.

In the earlier invention of U.S. Pat. No. 4,801,369, the primary purpose of the steam plenum was to separate $H_2$ and $O_2$, which, if allowed to mix, would combust. In this invention, the primary purposes are: a) to prevent the release of the combustion products ($CO_2$ and $H_2O$) into the atmosphere; b) to prevent oxygen from entering the fuel side of the generator, where it might damage the fuel electrode and would certainly cause direct combustion of the fuel, thus reducing the effectiveness of the generator; and c) to prevent nitrogen from entering the fuel stream, where it would ultimately impede the condensation of water vapor and the separation of $CO_2$.

Referring again to FIGS. 1 and 3, in all cases, a stream of steam is utilized to flow horizontally through a barrier plenum, which is sandwiched between the generator section and the vitiated air exhaust plenum, thereby separating the two. Steam is permitted to leak through small annular clearances between the baffles which form the plena and the cell outer diameter. Steam which leaks into the exhaust air plenum is wasted, while steam which leaks into the fuel side is in part used in the fuel reformation process and can be recovered in an external condenser to yield a pure water supply. No fuel interacts with the oxidant in this design.

The present invention may be embodied in other forms without departing from the spirit or essential attributes thereof, and accordingly, reference should be made to both the appended claims, and to the foregoing specification as indicting the scope of the invention.

What is claimed is:

1. A high temperature fuel cell generator comprising a generator chamber containing solid oxide electrolyte fuel cells, which operate on oxidant and fuel to yield a depleted oxidant stream and a depleted fuel stream consisting essentially of unreacted fuel, $CO_2$ and $H_2O$, where the oxidant and fuel streams do not communicate directly with each other, so that depleted oxidant and depleted fuel remain effectively separated, where a separate stream plenum separates the depleted oxidant and depleted fuel streams, and where the steam is at a pressure higher than either the depleted oxidant or depleted fuel streams, and where there is a leakage of steam into at least one of the depleted oxidant and depleted fuel streams.

2. The fuel cell generator of claim 1, where the fuel cells are tubular fuel cells.

3. The fuel cell generator of claim 1, where the stream is at a pressure higher than either the depleted oxidant or depleted fuel streams due to a constricting means at the exit of the steam plenum.

4. The fuel cell generator of claim 1, where the fuel cells comprise tubular electrolyte disposed between tubular electrodes, and where the depleted fuel stream will always contain $CO_2$ and $H_2O$.

5. The fuel cell generator of claim 1, where the pressure of the steam is at least 6.89 kPa higher than the pressure of either the depleted oxidant stream or the depleted fuel stream.

6. The fuel cell generator of claim 1, where fuel reformer passages are positioned between the fuel cells.

7. The fuel cell generator of claim 1, also containing a high fuel utilization section to deplete the depleted fuel further, to essentially all $CO_2$ and $H_2O$.

8. The fuel cell generator of claim 3, where the fuel cells are tubular, where there are no seals between the flow of steam and the depleted oxidant and depleted fuel streams, and where the depleted fuel stream contains at least 80 vol. % $CO_2$ and $H_2O$.

9. The fuel cell generator of claim 5, having an associated condensing means to condense water so that the depleted fuel consists essentially of carbon dioxide.

10. The fuel cell generator of claim 3, where the constricting means is an orifice or a venturi.

11. A method of operating a high temperature fuel cell generator containing solid oxide fuel cells with a solid electrolyte disposed between an air electrode and a fuel electrode which operate on oxidant and fuel gases, comprising the steps: (1) feeding feed fuel gas to contact fuel electrodes of fuel cells to yield a depleted fuel gas stream consisting essentially of unreacted fuel, $CO_2$ and $H_2O$, and (2) feeding oxidant gas to contact air electrodes of fuel cells to yield a depleted oxidant gas stream; where depleted oxidant gases are kept separated from all depleted fuel gases by a flow of steam, where the pressure of the steam is at least 6.89 kPa higher than the pressure of either the depleted oxidant stream or the depleted fuel stream, and where the depleted fuel stream will always contain at least 80 vol. % $CO_2$ and $H_2O$.

12. The method of claim 11, where the fuel cells are tubular, where the steam flow is through a steam plenum located between the depleted oxidant gas stream and the partially depleted fuel gas stream, where there is leakage of steam into at least one of the depleted oxidant stream or the partially depleted fuel stream, and where the depleted fuel stream will always contain $CO_2$ and $H_2O$.

13. The method of claim 11, where a separate steam plenum separates the depleted oxidant and depleted fuel streams, and where the steam is at a pressure higher than either the depleted oxidant or depleted fuel stream, due to a constricting means at the exit of the steam plenum.

14. The method of claim 13, where the constricting means is an orifice or a venturi.

* * * * *